(12) United States Patent
Walsch et al.

(10) Patent No.: US 7,805,547 B2
(45) Date of Patent: Sep. 28, 2010

(54) PROCESS AND DEVICE FOR THE TRANSMISSION OF DATA BETWEEN A PROCESSOR AND A MASS MEMORY UNIT

(75) Inventors: Alexander Walsch, Ludwigshafen (DE); Martin Tschuch, Stutensee (DE)

(73) Assignee: PII Pipetronix GmbH, Stutensee (DE)

( * ) Notice: Subject to any disclaimer, the term of this patent is extended or adjusted under 35 U.S.C. 154(b) by 131 days.

(21) Appl. No.: 11/739,146

(22) Filed: Apr. 24, 2007

(65) Prior Publication Data
US 2007/0260770 A1    Nov. 8, 2007

(30) Foreign Application Priority Data
Apr. 25, 2006    (DE) .................... 10 2006 019 018

(51) Int. Cl.
*G06F 13/28* (2006.01)
*G06F 13/36* (2006.01)

(52) U.S. Cl. ........................ 710/27; 710/315
(58) Field of Classification Search ............ 710/27, 710/315

See application file for complete search history.

(56) References Cited

U.S. PATENT DOCUMENTS

| 5,668,957 | A | | 9/1997 | Davis et al. |
|---|---|---|---|---|
| 5,956,266 | A | * | 9/1999 | Wilson et al. ............... 365/145 |
| 6,295,569 | B1 | * | 9/2001 | Shimura et al. ............ 710/305 |
| 6,795,327 | B2 | * | 9/2004 | Deng et al. .................. 365/63 |
| 7,577,760 | B2 | * | 8/2009 | Lee ................................ 710/2 |
| 2005/0246477 | A1 | * | 11/2005 | Adams et al. ............... 710/315 |

OTHER PUBLICATIONS

Definition of CRC, 2000, Collins Dictionary of Computing.*

* cited by examiner

*Primary Examiner*—Henry W Tsai
*Assistant Examiner*—Hyun Nam
(74) *Attorney, Agent, or Firm*—McGlew and Tuttle, P.C.

(57) ABSTRACT

A process for the transmission of data between a processor and a mass memory unit, initialization and/or control commands are transmitted via a PCMCIA interface to the mass memory unit, while user data, however, are transmitted via a memory interface. Accordingly, a device for the transmission of data between a processor and an (ATA) mass memory unit has a driver designed for switching over the transmission paths of initialization and/or control commands via a PCMCIA interface and of user data via a memory interface.

13 Claims, 4 Drawing Sheets

PROCESS AND DEVICE FOR THE TRANSMISSION OF DATA BETWEEN A PROCESSOR AND A MASS MEMORY UNIT

CROSS REFERENCE TO RELATED APPLICATIONS

This application claims the benefit of priority under 35 U.S.C. §119 of German Patent Application DE10 2006 019018.1 filed Apr. 25, 2006, the entire contents of which are incorporated herein by reference.

FIELD OF THE INVENTION

The present invention pertains to a process and a device for the transmission of data between a processor and a mass memory unit.

BACKGROUND OF THE INVENTION

Reference is made to the following concerning the technology used: A mass memory unit is defined as an EDP (electronic data processing) data memory unit, which is presented to the processor in the form of registers via an interface, and especially an ATA (advanced technology attachment) interface. An EDP data memory unit is designated here as a memory, which is actuated via the memory interface. In this case, the memory interface is the interface of a processor, with which the main memory (SDRAM, SRAM) or a FLASH memory is actuated. On the other hand, a PCMCIA interface is an interface of a processor, with which an (ATA) mass memory unit or PCMCIA I/O unit is actuated. In embedded systems, the 16-bit variant is usually used. The compact flash interface represents another interface, with which a compact flash card (CF card) is actuated. CF cards are ATA-capable; if necessary, they communicate in the so-called True IDE (Integrated Drive Electronics) Mode. All data traffic with the outside world is generally designated as I/O (In/Out), whereby the main memory hereby is not considered to be the outside world, but an external memory that lies outside of the processor. A generally dedicated I/O bus contains an I/O interface, which makes it possible to exchange data rapidly (wide/burst) with the outside world, which also provides an interface to other I/O buses (with commercially available ASICs (application-specific integrated circuits) as bridges). The term data generally comprises both control and/or initialization commands and user data. Control commands are commands to the mass memory unit. This mass memory unit is made known to the system by means of initialization.

Traditional I/O architectures use only one bus for communication with an individual unit. An I/O interface, which may be present as the only such interface especially in embedded systems, is the PCMCIA interface of the Personal Computer Memory Card International Association or even the Compact Flash interface. Units which can be connected to a PCMCIA interface are (ATA) mass memory units or I/O units, such as network data, modems or the like. I/O cards are actuated via a sequence of registers, via which the software sends commands to this means and can receive status information. The PCMCIA standard is ATA-compatible, so that a transmission of the ATA protocol is possible via the PCMCIA interface. The PCMCIA interface is—even though high synchronizations are theoretically possible—very slow, in practice, however, especially if it—as usual—has only a 16-bit-wide data bus, so that the transmission rates possible with mass memory units cannot be achieved.

Embedded systems, such as with a RISC (Reduced Instruction Set Computer) processor, for example, an XScale processor from the firm of Intel, is used in the applications for various reasons, and especially because the power consumption of such processors is low and they have a small space requirement. This is especially important in an inspection pig for a pipeline, whose computer system has to be supplied over a long time and long distances with energy guided to it stored in the form of a storage battery or a battery.

Embedded systems—such as those mentioned—usually have a PCMCIA interface. However, in this case, they do not have a dedicated I/O bus, such as the PCI (Peripheral Component Interconnect) bus. Such a bus is a bus, which is separated by a bridge-type means from the system memory bus with a wide, synchronous, burstable interface, especially with the width of the data bus of the processor.

PCMCIA-ATA software unit drivers are widely distributed for various platforms and operating systems. However, even in embedded systems, it is possible to access certain memory units, such as Flash-EEPROM and SRAM by means of the memory controller of the system, which, because of the 32-bit width of the bus, increases the transmission rate due to a fast, wide, burstable interface. The attachment of the ATA protocol to a memory interface is, however, extremely difficult and thus is connected with a long implementation time and probably a number of traps. Therefore, this is not suitable for industrial systems with a limited lifetime.

A memory device (such as SDRAM, SRAM, FLASH memory)—in the defined meaning—cannot be activated by a PCMCIA interface and vice versa, since both the physical and logical parts of the access mode are different, whereby the physical parts define signals and the time response, while the logical parts define how the device is presented to a processor and, moreover, how it defines any commands that are necessary to initiate and maintain a connection or transmission. The signals and time response of such a memory interface are especially not compatible with the ATA time control. A direct link of an ATA mass memory unit to a memory interface is therefore difficult and requires, as stated, lengthy implementations. The initializations of the mass memory unit, initialization commands and the initialization of the DMA (Direct Memory Access) transmission to the mass memory unit are especially time-consuming to be implemented. An essential drawback of PCMCIA-common connections is the limited bus rate. Even if a 32-bit processor is used, the I/O data path width is hereby reduced to 16 bits. A memory interface is, as stated, also available for embedded processors in order to make possible a connection to certain memories, such as Flash-EEPROM, SRAM and SDRAM.

SUMMARY OF THE INVENTION

Therefore, the basic object of the present invention is to create a process for the transmission of data between a processor and a mass memory unit for a processor, which has a PCMCIA interface, but not a dedicated, generic I/O interface, as well as to provide a corresponding device.

According to the present invention, the said object is accomplished with a process of the type mentioned in the introduction in that initialization and/or control commands are transmitted to the (ATA) mass memory unit via a PCMCIA interface, but user data are transmitted via a memory interface. Furthermore, to accomplish the said object, the present invention provides a device of the type mentioned in the introduction, which is characterized by a driver designed for switching over the transmission paths of initialization and/or control commands via a PCMCIA interface and of user data via a memory interface.

By means of the present invention, it is achieved that the fastest data path of the processor system can be used for user data transmission, while the slower PCMCIA data path is, furthermore, used for initialization and control. Switching over between the two data paths takes place in such a way that both the data transfer and the data integrity are guaranteed.

While the user or mass data are transmitted via the memory interface, the slow data path of the PCMCIA is retained as the control path for all other data, namely the initialization and control commands. The combination of the use of separate data paths makes possible a faster transmission rate for the user data. The process according to the present invention is simple and can be implemented in a short time. The advantages of the present invention lie in the fact that conventional software can be used for initialization and control, whereby smaller changes, which are not very time-consuming, can be carried out mainly in the driver area. As stated, the memory interface is used for the user data, which is burstable and DMA-capable, and if necessary, makes possible a synchronous, fast data transmission.

The transfer must not take place via processor DMA. A PIO (Programmed Input/Output)-based transmission may also be used.

By means of the present invention, the advantages of the PCMCIA interface and the memory interface are connected to one another, so that both the advantage of conventionally present software structures and a high data transmission rate can be utilized. The memory means is actuated by the PCMCIA interface and a PCMCIA-ATA unit driver with slight modifications.

According to preferred variants of the process according to the present invention, provisions are made for the processor to announce to the (ATA) mass memory unit the transmission of user data by means of corresponding control commands sent out via the PCMCIA interface, then it is switched over for the transmission of the user data to the memory interface, and the user data are transmitted via the memory interface to the mass memory unit, whereby later, after completion of the transmission of the user data, a switch back to the PCMCIA interface takes place in order to read back the status.

While initialization and control commands are transmitted unbuffered, the process according to the present invention provides, furthermore, for the user data to be buffered during transmission and/or for a check of the user data for integrity (CRC check) to be carried out during the transmission, such that, accordingly, the device according to the present invention is characterized by a data buffer and/or a means for checking the integrity for the user data.

The above-mentioned means, which are external to the processor, may be embodied in a printed circuit board (PCB), such as especially by a programmable logic circuit in the form of an FPGA (Field Programmable Gate Array). The PCMCIA bus is connected to this logic means, whereby an asynchronous logic is present for the PCMCIA connection, while the additional synchronous components, which make possible a storage and/or integrity check, are provided for the high data rate of the user data.

Further advantages and features of the present invention arise from the claims and from the following description, in which exemplary embodiments of the present invention are explained in detail with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention is illustrated.

DESCRIPTION OF THE PREFERRED EMBODIMENT

Figure 1:
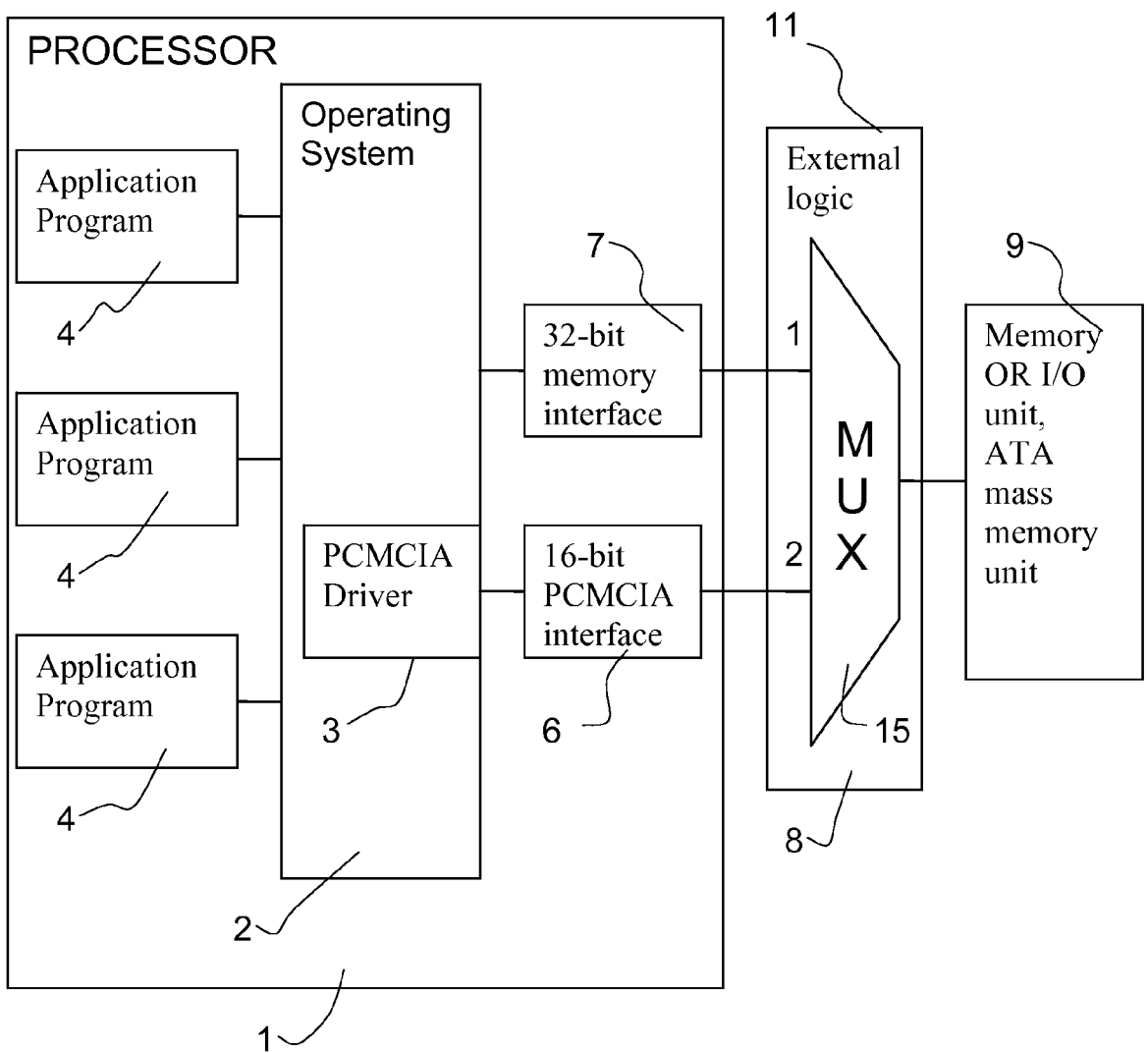
FIG. 1 is schematic view of a first schematically shown embodiment of a device according to the present invention.

Referring to the drawings in particular, in the embodiment of the figures, the present invention starts with a processor, as it is used in embedded computer systems, such as for example, a RIS microprocessor in the form of an XScale processor, preferably of the PXA family, such as PXA255 from the firm of Intel.

An operating system 2, as well as driver, especially a PCMCIA driver 3 run on such a processor 1. The PCMCIA driver 3 is adapted according to the present invention in the manner described further below. Furthermore, application programs 4 are processed in the processor 1.

At first, a processor of this type has a PCMCIA interface 6 for connection to external mass memory units and, moreover, a memory interface 7. In the PXA processors, these two interfaces, which are different in terms of logic, are switchably placed on a common physical access, which is not shown in the drawing for the sake of clarity, since this is not the case in other processors, but rather, as is shown, a physical junction may be provided for each interface.

According to the present invention, the outputs of the PCMCIA interface 6 and the memory interface 7 are connected to a common external logic 11, whose essential element is a multiplexer 15, via which the interfaces can be connected or are connected to a mass memory unit 9, such as a hard disk, be it a P-ATA or an S-ATA hard disk.

The PCMCIA driver 3 is adapted according to the present invention in such a way that it is able to exchange initialization and control commands of the processor 1 via the PCMCIA interface 6 and the multiplexer 15 with the mass memory unit 9, while the driver switches over for the transmission of user data and mass data to the wider and thus faster transmission path of the memory interface 7 and likewise the multiplexer 15 to the mass memory unit 9.

Figure 2:
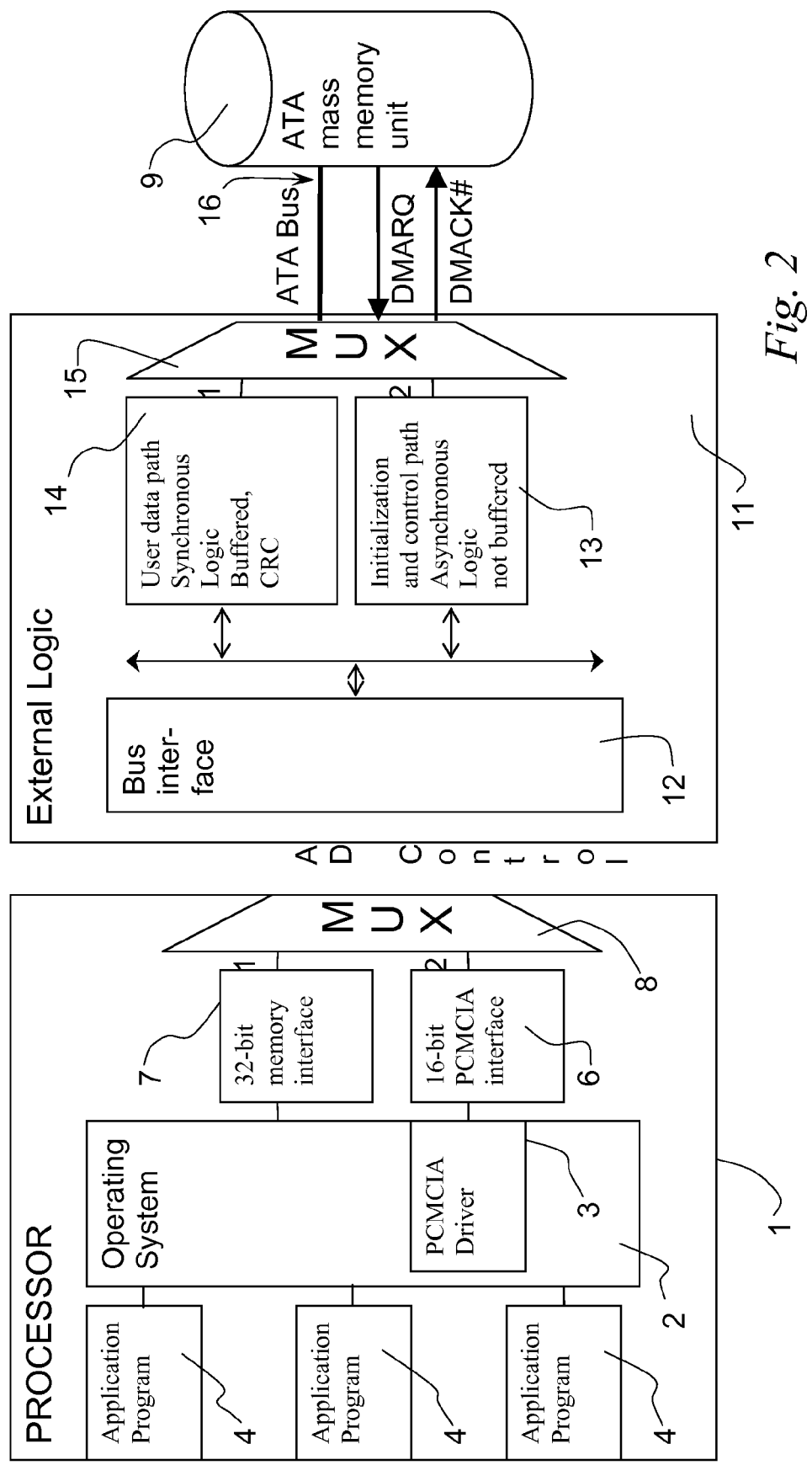
FIG. 2 is schematic view of a second, expanded embodiment of a device for the transmission of data according to the present invention.

The connection embodied according to the present invention, especially the external logic 11, is shown in a detailed embodiment in FIG. 2. FIG. 2 shows again the processor 1 with the operating system 2 and the PCMCIA driver 3 designed according to the present invention as well as user programs running on the processor 1, the PCMCIA interface 6 and the memory interface 7.

Figure 4:
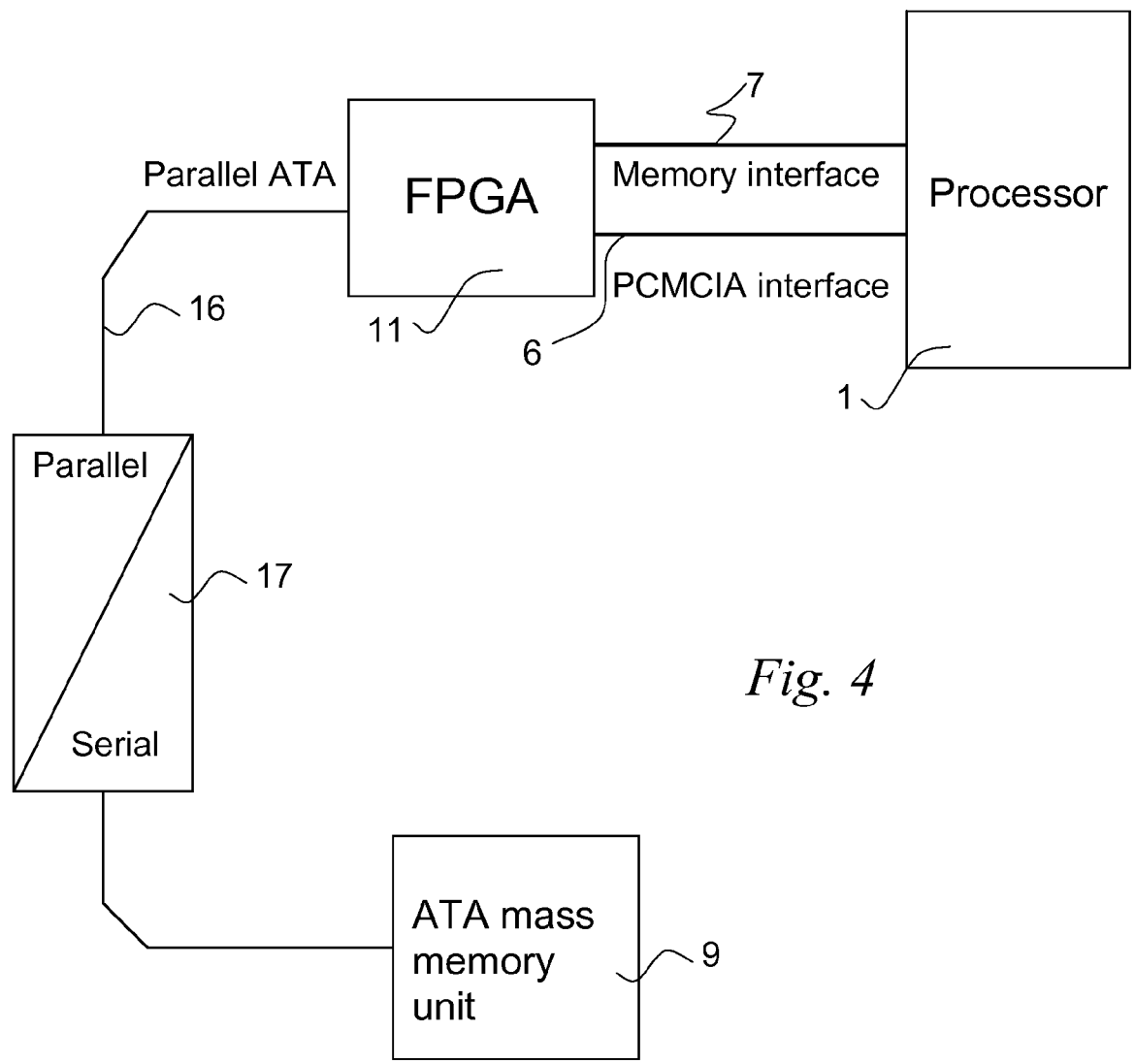
FIG. 4 is an embodiment of the device according to the present invention for the transmission of data with an FPGA.

The unit 11 which is placed between the processor 1 and the mass memory unit 9 may be embodied as an FPGA (Field Programmable Gate Array) (FIG. 4). The unit has an interface 12, via which the initialization and control commands are transmitted to the multiplexer 15 via a control command data path 13, whereby the transmission is not buffered and takes place asynchronously.

On the other hand, the transmission of the mass data to the multiplexer 15 takes place via a user data path and is preferably synchronous, whereby a buffering may take place. For this purpose, a FIFO may simply be provided, as a result of which the use of a memory bus is minimized, so that other processors, such as especially the memory bus in a multiprocessor system, may also be used in order to access the system memory. Furthermore, a check of the data for integrity may be carried out in the form of a cyclic redundancy check (CRC).

Figure 3:
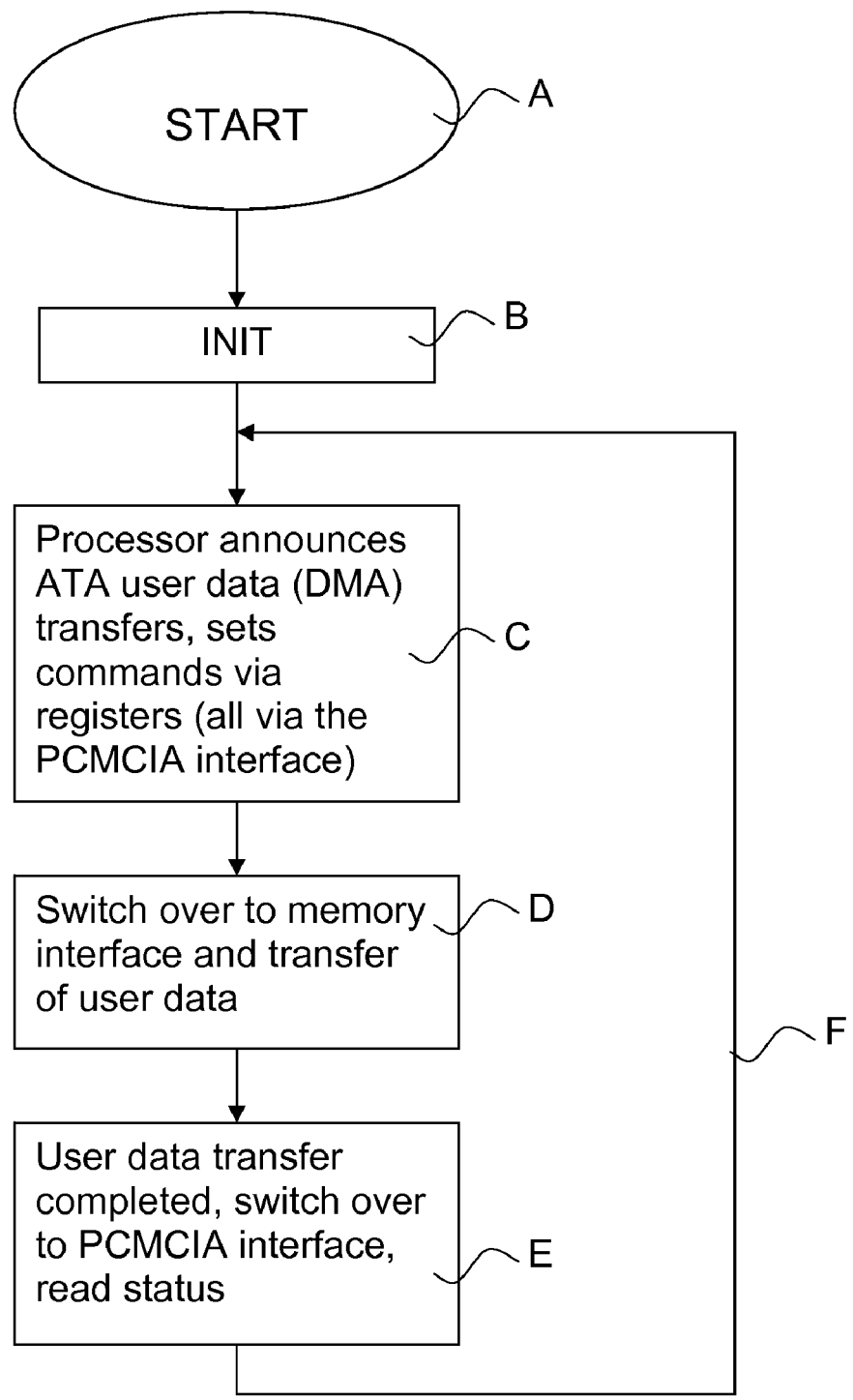
FIG. 3 is a flow chart of a concrete embodiment of the process according to the present invention.

This procedural course is basically shown from the view of the process in FIG. 3:

The transmission of the user data may take place by means of processor DMA. It is defined as a DMA transmission via the memory bus (which is not shown in FIG. 2, since this is not needed for the subject of the present invention). ATA-DMA is defined according to the ATA standard.

After starting (step A) and initializing (step B) the device, the processor announces an ATA-DMA transmission (step C). For this purpose, the processor 1 sets registers and sends corresponding commands via the PCMCIA interface 6 to the mass memory unit 9.

After that, the (ATA) mass memory unit 9 sends a request for DMA transmission (DMARQ). The data are sent from the processor main memory while switching over to the memory interface (step D). The DMARQ of the (ATA) mass memory unit 9 will be used as a start signal for a DMA transmission via the memory bus (processor DMA). This is architecture-dependent. It is important for the driver to be embodied in such a way that the user data are sent after receipt of the DMARQ signal.

During the transmission time of the user data, during which the data are transmitted according to the timing of the ATA specification, the transmission of control sequences is no longer in any way necessary, as was determined, and the processor may easily send out the user data. It should be noted in this case that DMACK# is set according to ATA specification, if data are sent via the ATA bus 16. This signal may be sent by the switched driver or directly by the unit.

If, as assumed in FIG. 2, an ATA-UDMA (Ultra DMA) transmission is used to send data from the memory (FPGA memory) to the mass memory unit 9, a cyclic redundancy check (CRC) is to be carried out.

After completion of the ATA-DMA transmission according to the ATA specification, the device switches, in step E, back into the control mode (loop F of FIG. 3) and thus to the PCMCIA interface 6. Only this interface is moved into the reading status, whereupon the system is ready (loop F) to transmit data again, if necessary.

The logic of the unit 11 exclusively transports data and meets the timing needs of the ATA link. The control signals are forwarded through only by the unit 11. A physical ATA signaling is to be implemented only for the user data path. In addition, the end of the transmission is managed.

Further data transmission takes place again in the manner described via the ATA bus 16 to the mass memory unit 9.

In the concrete embodiment of FIG. 4, the FPGA unit 11 of the form shown in detail in FIG. 3, which is arranged downstream of the processor 1, is schematically shown again. If the mass memory unit 9, as shown in FIG. 4, is a serial ATA mass memory unit (S-ATA), then a parallel-serial converter 7 may be provided. The components 1, 11, 17 may be arranged on a printed circuit board (PCB). The mass memory unit 9 is connected via an ATA or, in the view of FIG. 4, via an S-ATA link.

Within the framework of the present invention, it could be determined that with the use of the same mass memory unit 9, even 8 MB/sec. were transmitted via the PCMCIA interface, but 12.8 MB/sec. were transmitted with the process according to the present invention, which lies in the range of the transmission rate of a conventional PC [personal computer-Tr.] with a PCI-S-ATA controller of 12.5 MB/sec.

These measurement results show that according to the present invention, the transmission rate with the same processor-mass memory unit combination can be increased by 50% and thus reaches the transmission rate of a conventional personal computer in terms of order of magnitude.

While specific embodiments of the invention have been shown and described in detail to illustrate the application of the principles of the invention, it will be understood that the invention may be embodied otherwise without departing from such principles.

What is claimed is:

1. A process for the transmission of data between a processor and a mass memory unit, the process comprising:
   providing a processor;
   providing a mass memory unit;
   providing a peripheral component microchannel interconnect architecture (PCMCIA) interface operatively connected between the processor and the mass memory unit;
   providing a memory interface operatively connected between the processor and the mass memory unit;
   transmitting initialization and control commands from the processor to the mass memory unit exclusively via the PCMCIA interface;
   providing a common data bus connected to said mass memory unit and a multiplexer connected to said PCMCIA interface, said memory interface and said mass memory unit;
   transmitting user data from the processor to the mass memory unit exclusively via the memory interface;
   providing a driver, wherein a first transmission path is defined from said processor to said mass memory unit via said PCMCIA interface and a second transmission path is defined from said processor to said mass memory unit via said memory interface, said initialization and control commands being transmitted via said first transmission path, said user data being transmitted via said second transmission path; and
   switching over from one of said first transmission path and said second transmission path to another one of said first transmission path and said second transmission path via said driver.

2. A process in accordance with claim 1, wherein said step of transmitting initialization and control commands includes sending control commands from the processor to the mass memory unit via the PCMCIA interface to indicate the transmission of user data to the mass memory unit wherein subsequently transmission from the processor is switched over for said step of transmitting user data, including the transmission of the user data to the memory interface and the transmission of user data to the mass memory unit via the memory interface.

3. A process in accordance with claim 2, wherein a subsequent transmission from said processor is switched back to the PCMCIA interface after a completion of the transmission of the user data.

4. A process in accordance with claim 3, wherein initialization and control commands are transmitted unbuffered.

5. A process in accordance with claim 4, wherein the user data are buffered during the transmission.

6. A process in accordance with claim 4, wherein during said step of transmitting user data a check of the user data for integrity (CRC check) is made.

7. A device for the transmission of data between a processor and a mass memory unit, the device comprising:
- a peripheral component microchannel interconnect architecture (PCMCIA) interface operatively connected between the processor and the mass memory unit, said PCMCIA interface transmitting initialization and control commands between the processor and the mass memory unit;
- a memory interface operatively connected between the processor and the mass memory unit, said memory interface transmitting user data between the processor and the mass memory unit, said PCMCIA not transmitting the user data, said memory interface not transmitting said initialization and control commands;
- a common data bus;
- a multiplexer, said PCMCIA interface and said memory interface being connected to said common data bus via said multiplexer;
- a driver for switching over transmission paths for transmitting said initialization and control commands from the processor to the mass memory unit via said PCMCIA interface and for transmitting said user data from the processor to the mass memory unit via said memory interface.

8. A device in accordance with claim 7, further comprising at least one of a data buffer and a data integrity checking means for the integrity checking of the user data.

9. A data transmission system comprising:
- a system processor;
- a system mass memory unit;
- a peripheral component microchannel interconnect architecture (PCMCIA) interface operatively connected between said system processor and said system mass memory unit, said PCMCIA interface transmitting initialization and control commands between said system processor and said system mass memory unit, wherein a first transmission path is defined from said system processor to said system mass memory unit via said PCMCIA interface;
- a memory interface operatively connected between system processor and system mass memory unit, said memory interface transmitting user data between said system processor and said system mass memory unit, wherein a second transmission path is defined from said system processor to said system mass memory unit via said memory interface;
- a common data bus;
- a multiplexer, said PCMCIA interface and said memory interface being connected to said common data bus via said mutliplexer;
- a driver means for switching over from one of said first transmission path and said second transmission path to another one of said first transmission path and said second transmission path.

10. A system in accordance with claim 9, wherein said driver means switches over the transmission paths of said processor for sending control commands from system processor to system mass memory unit via system PCMCIA interface to indicate the transmission of user data to system mass memory unit wherein subsequently transmission from system processor is switched over for transmitting user data, including the transmission of the user data to system memory interface and the transmission of user data to system mass memory unit via system memory interface.

11. A system in accordance with claim 10, wherein said driver means switches over the transmission paths of said processor to system PCMCIA interface for a subsequent transmission from said processor, after a completion of the transmission of the user data.

12. A system in accordance with claim 11, further comprising at least one of a data buffer and a data integrity checking means for the integrity checking of the user data.

13. A system in accordance with claim 11, further comprising a data buffer for buffering user data being transmitted from said processor to said mass memory unit.

* * * * *